July 17, 1962 — R. L. GOLD ET AL — 3,044,582
BRAKE SYSTEM
Filed June 16, 1958 — 2 Sheets-Sheet 1
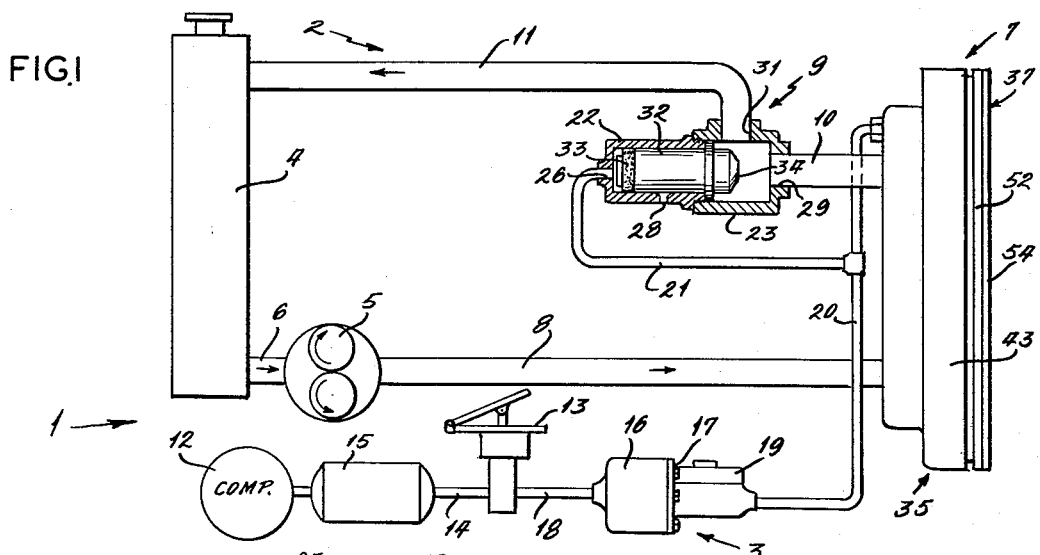
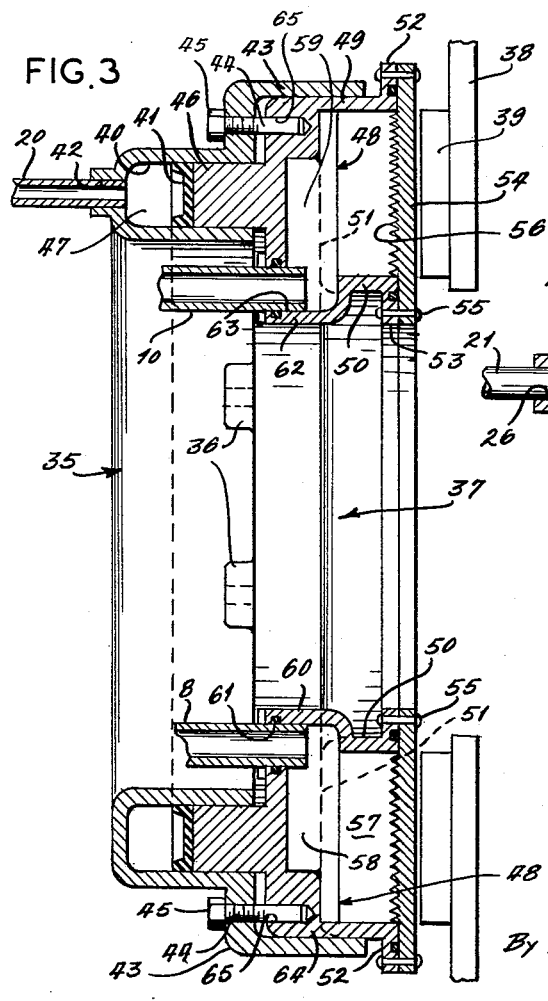
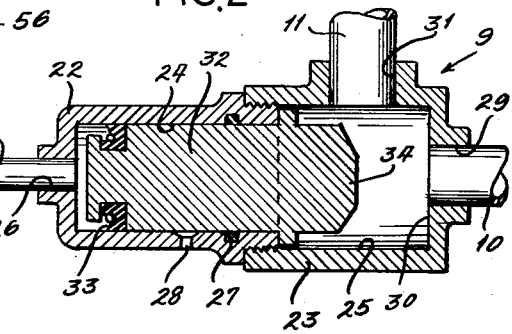
INVENTORS:
ROBERT L. GOLD
ROBERT E. SCHWARTZ
By Gravely, Lieder & Woodruff
ATTORNEYS July 17, 1962 R. L. GOLD ETAL 3,044,582
BRAKE SYSTEM
Filed June 16, 1958 2 Sheets-Sheet 2
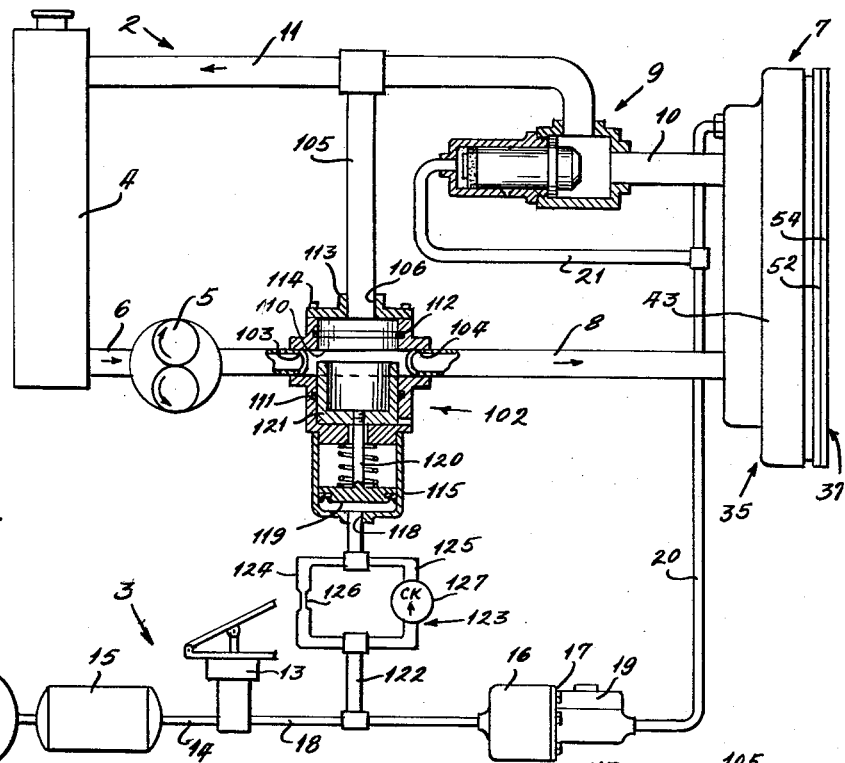
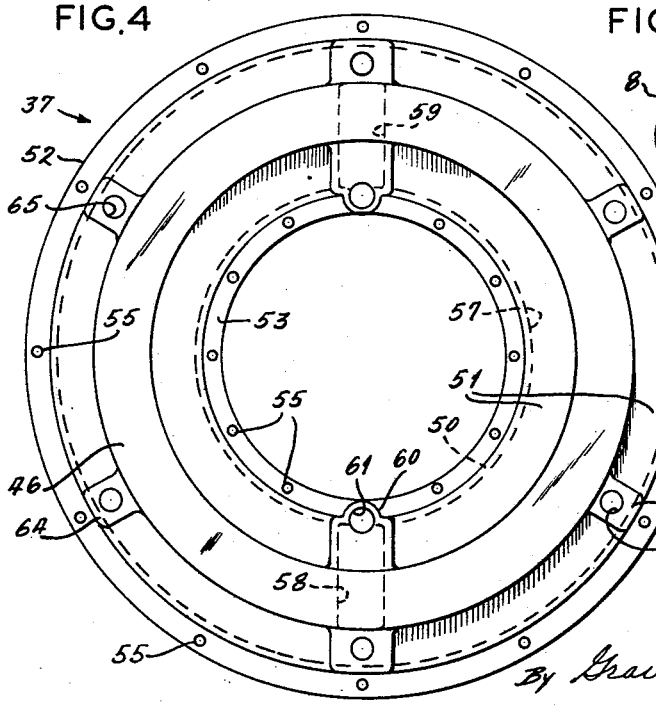
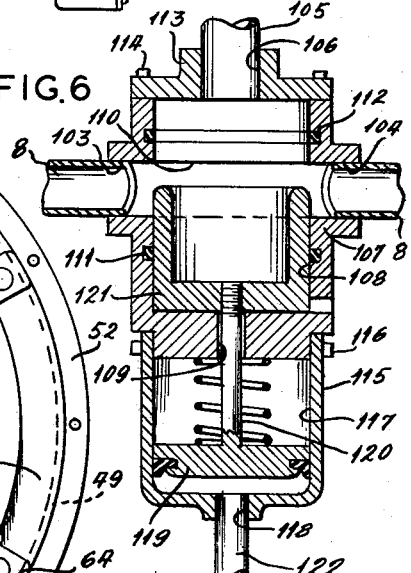
INVENTORS:
ROBERT L. GOLD
ROBERT E. SCHWARTZ
By Gravely, Lieder & Woodruff
ATTORNEYS.

United States Patent Office 3,044,582
Patented July 17, 1962

3,044,582
BRAKE SYSTEM
Robert L. Gold, Pine Lawn, and Robert E. Schwartz, University City, Mo., assignors to Wagner Electric Corporation, St. Louis, Mo., a corporation of Delaware
Filed June 16, 1958, Ser. No. 742,278
10 Claims. (Cl. 188—264)

This invention relates to brake systems and in particular to those employing a pressure fluid for brake cooling purposes and a separate pressure fluid for brake energization purposes.

In past brake systems employing fluid cooled brake devices, a pressure fluid was circulated through an annular piston on one side of a metallic friction element attached thereto; and, when said pressure fluid was pressurized, said annular piston was actuated to frictionally engage said metallic friction element with a cooperating, non-metallic element for braking purposes. In other words, the braking device was cooled by the pressure fluid flow from large capacity pumping means and was energized by the restriction or throttling of said pressure fluid flow. When this high volume flow was restricted or throttled, it was found that good response in the system was not readily attainable; however, when better response was attained, it was found that the system stability was sacrificed. The term response is defined as the accuracy with which the output follows the input. In this manner, the sacrifice of system stability caused undesirable chatter in the brake system and resulted in erratic overshooting or undershooting of the desired fluid pressure to energize the brake device during specific deceleration conditions.

An object of the present invention is to provide a brake system in which the brake devices are cooled by a pressure fluid other than that employed to actuate said brake devices.

Another object of the present invention is to provide a brake system having stability along with a high degree of response.

Another object of the present invention is to provide a brake system in which the fluid pressure of the cooling fluid and the fluid pressure of the actuating fluid are maintained substantially proportional.

A further object of the present invention is to reduce parasitic power loss or load on the cooling system pumping means during non-braking periods by by-passing the cooling fluid around the brake device to reduce the total resistance of the system to cooling fluid flow.

And a still further object of the present invention is to provide a time delay circuit which insures substantially complete heat dissipation after a braking period.

These and other objects and advantages will become apparent hereinafter.

Briefly, the instant invention is embodied in a cooling system which continuously circulates cooling fluid through a brake device, and a separate actuating system adapted to energize said brake device; and, means to maintain the fluid pressures of both systems substantially proportional.

This invention also consists in the parts and in the arrangement and combination of parts hereinafter described and claimed. In the accompanying drawings which form a part of this specification and wherein like numerals refer to like parts wherever they occur:

FIG. 1 is a schematic diagram of a brake system embodying the present nivention, FIG. 2 is a sectional view showing the throttling valve of the preferred embodiment in cross-section, FIG. 3 is a sectional view showing the brake device of the preferred embodiment in cross-section, FIG. 4 is an elevational view of the friction member of the brake device of the preferred embodiment, FIG. 5 is a schematic diagram of a brake system which is a modification of the preferred embodiment, FIG. 6 is a sectional view showing the by-pass valve of the modification of the preferred embodiment in cross-section.

Referring first to FIG. 1 in detail, for an understanding of the basic brake system 1, the system 1 comprises a cooling branch or system and a separate actuating branch or system indicated generally at 2 and 3.

The cooling branch 2 is provided with a heat exchanger 4 which also serves as a reservoir for cooling fluid; however, a separate reservoir to accommodate surges could be employed in combination with the heat exchanger 4, but for simplicity, said heat exchanger alone is shown. The heat exchanger 4 is connected to the suction side of pumping means 5 by a conduit 6, said pumping means being driven by the vehicle motor (not shown) or other means, as desired; and, the discharge side of said pumping means is connected to the inlet port of a friction or brake device 7 by a conduit 8. The outlet port of the friction device 7 is connected to the receiving port of a throttling valve 9 by a conduit 10, and the return port of the throttling valve 9 is connected to the heat exchanger 4 by a return conduit 11.

The actuating branch 3 is provided with compressor 12 which is connected to the inlet side of an application valve or operator control means 13 by a conduit 14 having a reservoir 15 interposed therein. The outlet side of the application valve 13 is connected to an air chamber portion 16 of a conventional power cluster or pressure generating means 17 by a conduit 18, said power cluster having a master cylinder portion 19 operably connected with said air chamber portion. To complete the brake system 1, the master cylinder portion 19 of the power cluster 17 is connected to the actuating port of the friction device 7 by conduit 20, and another conduit 21 has one end intersecting said conduit 20 while the other end thereof connects with the control port of the throttling valve 9 in the cooling branch 2. Although a manually actuated master cylinder could be employed in the actuating system 3, the power cluster 17, as shown, is preferred for large heavy vehicles.

The throttling valve 9, FIG. 2, is provided with fixedly engaged housing portions 22 and 23 having axially aligned bores 24 and 25, respectively, therein. A control port 26 which receives the conduit 21, as previously mentioned, is provided in the housing portion 22 connecting with one end of the bore 24, and an O-ring seal 27 is carried adjacent the other end of said bore while a drain 28 is positioned near the mid-portion thereof. A flow receiving port 29 which receives the conduit 10, as previously mentioned, is provided in the housing portion 23 connecting with one end of the bore 25 and forming a shoulder 30 therewith; and, a return port 31 which receives the conduit 11, as previously mentioned, is provided in the sidewall of said bore. A stepped piston 32, which is slidably received in bores 24 and 25, is provided with a seal 33 on its leftward end and an integral throttling head 34 on its rightward end for flow throttling cooperation with the shoulder 30. Thus, the piston 32 is responsive to fluid pressure in the bore 24 to restrict or throttle the fluid flow through the bore 25; and, any seepage past the seals 27 and 33 drains from the system through the drain port 28 thereby completely separating the fluid in the bore 24 from that in the bore 25.

The friction device 7, FIGS. 3 and 4, includes an annular housing 35 having a plurality of integrally formed mounting flanges 36 for attachment with a non-rotatable member, such as a vehicle axle flange (not shown), and said housing is adapted to receive an annular friction piston or member 37. The friction device 7 also includes a disc 38 for fixed attachment with a rotatable member, such as a vehicle wheel (not shown), and a friction material or lining 39 is carried on said disc in a position to be engaged by the friction member 37 to effect a braking application.

The housing 35 is provided with an annular bore 40 in which is received an annular seal 41 for sealing contact with the friction member 37; and, an actuating port 42 which fixedly receives the conduit 20, as previously mentioned, is provided through the end wall of said bore. The housing 35 is also provided with a flange portion 43 integrally formed adjacent the open end of the bore 40 for friction member guiding purposes; and, a plurality of bores 44 are provided in said housing adjacent the periphery of said flange portion having axially extending anchor pins 45 threadedly received therein.

The friction member 37 is provided with an annular plunger 46 which is slidably received in the housing bore 40 having one end thereof adapted to seat the annular seal 41; and, an expansible actuating chamber 47 for pressure fluid is defined in the housing 35 by the walls of said bore and said plunger in abutment with said seal. The friction member 37 is also provided with an enlarged channel member 48 integrally formed with the other end of the plunger 46 and slidably engageable with the housing flange portion 43. The channel member 48 is C-shaped in cross section having side walls 49 and 50 which are interconnected by a base wall 51. The ends of the side walls 49 and 50 are provided with seal carrying, radially extending flanges 52 and 53, respectively, for sealable engagement with a relatively thin, annular, friction element or plate 54. The friction element 54 is attached to the flanges 52 and 53 of the channel member 48 by suitable means, such as a plurality of rivets 55. The friction element 54 is preferably formed of copper or some similar metal having high heat conductivity properties and is provided with a plurality of concentric fins 56 on the inner surface thereof to enhance heat transfer. In this manner, a flow or circulation chamber 57 for cooling fluid is defined between the base and side walls of the C-shaped channel 48 and the inner surface of the friction element 54.

The base wall 51 is provided with integral, diametrally opposed, recessed inlet and outlet plenum chambers 58 and 59 in communication with the circulation chamber 57. An integral duct 60 is formed in the base wall 51 having a seal carrying inlet port 61 therein which connects with the inlet plenum chamber 58; and, another integral duct 62 is also formed in the said base wall having a seal carrying outlet port 63 therein which connects with the outlet plenum chamber 59. The ports 61 and 63 slidably and sealably receive the inlet and outlet conduits 8 and 10, respectively, of the cooling branch 2, as previously mentioned. The base wall 51 of the channel 48 is also provided with a plurality of spaced, integral lugs 64 having anchor pin receiving bores 65 therein which are adapted to align with and slidably receive the anchor pins 45 fixedly positioned in the flanged portion 43 of the housing 35. In this manner, the friction member 37 is axially movable relative to the housing 35, but rotation thereof is prevented by the anchor pins 45.

Thus, the inlet and outlet plenum chambers 58 and 59 in conjunction with the circulation chamber 57 provide a path through the friction device 7 for the cooling fluid of the cooling branch 2 which is entirely separate from the actuating chamber 47 in said friction device in which pressure fluid is received from the actuating branch 3.

In the actuating chamber 47, the area of the plunger 46 is considerably less than the area of the friction element 54 in circulation chamber 57 in order to maintain the volume of fluid necessary to energize the friction member 37 at a minimum and still utilize a much larger volume of fluid in the circulation chamber 57 necessary to adequately cool the friction element 54 during a braking application.

In the operation of the cooling branch 2 of the brake system 1, pumping means 5 continuously delivers cooling fluid from the heat exchanger 4 through conduits 6 and 8 to the inlet port 61 in the friction member 37 of the friction device 7. The cooling fluid is then circulated through the inlet plenum chamber 58 and the chamber 57 in direct engagement with the inner surface of the friction element 54 at all times and therefrom to the outlet plenum chamber 59 and the outlet port 63. From the outlet port 63, the cooling fluid flows through the conduit 10 into the receiving port 29, the bore 25, and the return port 31 of the normally unrestricted throttling valve 9 and therefrom through the return conduit 11 back into the heat exchanger 4 for recirculation in the cooling branch 2. Of course, the fluid pressure of the cooling fluid is just great enough to overcome the inherent resistances of the cooling branch 2 when the throttling valve 9 is unrestricted; however, the volume of flow through said cooling branch is necessarily high in order to dissipate the intense heat generated during a braking application, as will be described hereinafter.

Assuming the reservoir 15 in the actuating branch 3 of the brake system 1 is fully charged by compressor means 12 when the operator desires to decelerate or make a complete stop, the application valve 13 is actuated to meter fluid pressure at a desired rate through the conduit 18 to the power cluster 17. This fluid pressure actuates the air chamber portion 16 of the power cluster 17 which in turn actuates the master cylinder portion 19 thereof to simultaneously displace pressure fluid through the conduit 20 into the actuating portion 42 and actuating chamber 47 of the brake housing 35 and also through the branch conduit 21 into the bore 24 of the throttling valve 9. In this manner, the displaced pressure fluid simultaneously develops a fluid pressure in the actuating chamber 47 of the friction device 7 and the bore 24 of the throttling valve 9. The fluid pressure developed in the actuating chamber 47 acts on the effective area of the sealing cup 41 creating a brake applying force which urges the friction member 37 rightwardly in FIG. 3 whereby the outer surface of the friction element 54 is moved into frictional engagement with the friction material 39 on the disc 38 creating a force on said friction element in opposition to the brake applying force. Substantially simultaneously with the energization of the friction device 7, the fluid pressure created in the bore 24 of the throttling valve 9 acts on the effective area of the piston 32 therein moving said piston rightwardly whereby the throttling head 34 in the bore 25 is moved toward the throttling shoulder 30 to restrict or throttle the cooling fluid flow. This throttling of cooling fluid flow establishes a pressure differential across the throttling shoulder 30 which can be described as a back pressure and which is effective in the entire cooling branch 2 prior to said throttling shoulder. By properly proportioning the effective areas of the piston 32, the throttling head 34, and the shoulder 30, the magnitude of the back pressure can be predetermined to equal the fluid pressure in the actuating branch 3 or be proportional thereto. In this manner, the back pressure prevails in the circulation chamber 57 of the friction device 7 and acts on the effective area of the friction element 54 to create a substantially equal force in opposition to the abovementioned force on said friction element due to the frictional engagement; therefore, permanent distortion or the collapse of said friction element is obviated during a braking application.

When the desired rate of deceleration is attained or the stop completed, the operator releases the application valve 13 thereby exhausting the air pressure from the air chamber portion 16 of the power cluster 17 through the conduit 18 and the exhaust port of said application valve. When the air chamber portion 16 is exhausted, the component parts thereof and of the master cylinder portion 19 return to their original positions thereby allowing the displaced pressure fluid to return from the bore 40 of the friction device 7 and from the bore 24 of the throttling valve 9 to said master cylinder portion via conduits 20 and 21. As a result, the fluid pressure in the actuating branch 3 and consequently in the actuating chamber 47 of the friction device 7 is alleviated which serves to de-energize said friction device. The fluid pressure in the bore 24 of the throttling valve 9 is also simultaneously alleviated which allows the back pressure of the cooling fluid flow acting on the effective area of the throttling valve head 34 to move the throttling piston 32 to its original position obviating the aforementioned throttling action and reestablishing unthrottled or unrestricted cooling fluid flow through the throttling valve 9.

When the vehicle is again accelerated or placed in motion the rotation of the disc 38 and friction material 39 kicks or moves the friction member 37 leftwardly in the housing 35 whereby the friction element 54 is disengaged from said friction material or assumes a position of negligible drag relative thereto. Meanwhile cooling fluid is being circulated through the chamber 57 of the friction member 37, as previously described.

It is apparent that the pressure fluid flow in the cooling branch 2 is completely divorced from that of the actuating branch 3. Actuation of the master cylinder portion 19 of the power cluster 17 establishes a fluid pressure in the actuating chamber 40 of the friction device 7 which creates a force causing the friction member 37 to move the frictional element 54 into frictional engagement with the friction material 39 on the disc 38 for deceleration purposes. A substantial portion of the heat generated during this frictional engagement is conducted through the metallic friction element 54 and transferred to the cooling fluid flowing through the circulating chamber 57 of the friction member 37 and consequently through the cooling branch 2.

It is also apparent that the fluid pressures in the cooling branch 2 and actuating branch 3 are maintained substantially proportional. The fluid pressure of the actuating branch 3 is employed not only to energize the friction device during a braking application but also to actuate the throttling valve 9 in order to throttle the cooling fluid flow and create a pressure differential across said throttling valve which establishes a back pressure in the portion of the cooling branch 2 prior to said throttling valve. In other words, the back pressure is created by the throttling action of the throttling valve 9 which is in turn responsive to the intensity of the fluid pressure generated in the actuating branch 3.

From the above, it is apparent that completely divorcing the cooling fluid in the cooling branch 2 from that of the actuating branch 3 not only enhances the stability of the system 1 but also improves the response thereof. Due to this separation of the cooling and actuating branches 2 and 3, the actuating fluid is not restricted or throttled, as is the cooling fluid flow; therefore, the hunting or erratic braking inherent to throttled flow systems is obviated, and the stability or controllability of the instant brake system 1 is enhanced. Since the branches 2 and 3 are completely separated, it is no longer necessary to employ the relatively low pressure and high flow rates of the cooling branch 2 to energize the friction device 7; consequently, a reduced pressure fluid displacement is effected in the actuating branch 3 and a high fluid pressure is employed resulting in a better response and a more stable or controllable brake system 1.

A preferred brake system 101 embodying the present invention to which the claims are directed is shown in FIGS. 5 and 6 and incorporates the basic brake system shown in FIGS. 1-4 with the exceptions described hereinafter.

A by-pass valve 102 is interposed in the conduit 8 having an inlet 103 receiving cooling fluid from pumping means 5 and having an outlet 104 discharging cooling fluid to the friction device 7; and, a by-pass conduit 105 is interposed between a by-pass port 106 of the valve 102 and the return conduit 11 of the cooling branch 2. The by-pass valve 102 is provided with a housing 107 having a bore 108 and a centrally located aperture 109 in the lower end wall thereof. The inlet and outlet 103 and 104, which receive the conduit 8, as previously mentioned, are oppositely positioned near the mid-portion of the bore 108 in communication with an undercut passage 110 in said bore, and O rings 111 and 112 are carried by said bore above and below said undercut passage. The upper end of the bore 108 is closed by an end cap 113 which is fixedly attached to the housing 107 by suitable means, such as cap screws 114, said end caps having the by-pass port 106 therein which receives the by-pass conduit 105, as previously mentioned. An air chamber 115 is attached to the lower end of the housing 107 by suitable means, such as cap screws 116, and is provided with a bore 117 in alignment with the aperture 109. The air chamber 115 is provided with a port 118 in the lower end thereof for connection with the brake actuating system 3 (to be discussed later). A spring biased, seal carrying piston 119 is slidably received in the air chamber bore 117 having an integral rod 120 extending through the aperture 109 into the bore 108 of the housing 107. The rod 120 is threadedly received in the lower end of a cup shaped piston 121 which is slidably received in the bore 108 and the housing 107.

To complete the brake system 101, a conduit 122 has one end intersecting the conduit 18 while the other end thereof is received in the port 118 of the by-pass valve air chamber 115. A time delay circuit 123 is provided in the conduit 122 having branch conduits 124 and 125 connected in parallel therewith. The branch conduit 124 is provided with a restriction 126 to impair pressure fluid flow therethrough in either direction, and a uni-directional valve 127 is interposed in the branch conduit 125 allowing pressure fluid flow only from the application valve 13 to the by-pass valve air chamber 115.

In the operation, cooling fluid is normally discharged by pumping means 5 into the inlet 103 of the by-pass valve 102 and flows therefrom through the bore 108 into the by-pass port 106 and back to the heat exchanger 4 via by-pass and return conduits 105 and 11, respectively, for recirculation in the cooling branch 2.

Assuming that the reservoir 15 has been fully charged by compressor means 12 when the operator desires to decelerate or make a complete stop, the application valve 13 is actuated to meter air under pressure through the conduit 18 to the power cluster 17 which simultaneously actuates this friction device 7 and throttling valve 9, as previously described. Simultaneously with the above, the actuation of the application valve 13 also meters air to the by-pass valve air chamber 115 via conduits 18 and 122 and the branch conduit 125 through the check valve 127 therein. The air pressure acting on the effective area of the piston 119 in the air chamber bore 117 moves said piston upwardly; and, consequently the piston rod 120 moves the cup-shaped piston 121 upwardly in the housing bore 108. When the cup-shaped piston 121 is thus moved into sealable engagement with the O ring 112, the return port 106 is closed, and the cooling fluid flows from the inlet 103 of the by-pass valve 102 around said cup-shaped piston in the undercut passage 110 to the outlet 104. The cooling fluid flow then proceeds through the conduit 8 into the friction device 7 to dissipate the heat generated during braking, as previously described, and therefrom through the conduit 10, throttling valve 9, and back to the heat exchanger 4 via the return conduit 11 for recirculation in the cooling branch 2.

When the desired rate of deceleration is attained or the stop completed, the operator releases the application valve 13 thereby exhausting the air pressure to atmosphere from the power cluster 17 through the conduit 18 and the exhaust port of said application valve which alleviates the fluid pressure in the actuating branch 3, and also that in the cooling branch 2, as previously described. Simultaneously therewith, the air pressure in the air chamber bore 117 is also exhausted to atmosphere; however, the air pressure exhausted from said air chamber bore must flow through port 118, conduits 122 and 124 and the restriction 126, and the conduit 18 to the exhaust port of the application valve 13. The restriction 126 in the time delay circuit 123 creates a time delay allowing the fluid pressures in the cooling and actuating branches 2 and 3 to be alleviated before the by-pass valve 102 functions to by-pass the cooling fluid flow through the by-pass port 106, conduits 105 and 11, to the heat exchanger 4. Meanwhile, cooling fluid is afforded unrestricted circulation through the cooling branch 2 after the braking application for a period of time regulated by the restriction 126 to carry away a portion of the heat created during said braking application. Upon the delayed exhaustion of air pressure from the by-pass valve air chamber 115, the spring loaded piston 119 reassumes its original position therein which thereby moves the cup-shaped piston 121 to its original position in the housing bore 108. In this manner, the by-pass port 106 is opened and the cooling fluid by-passes the friction device 7 flowing through the by-pass conduit 105 to the return conduit 11 and back to the heat exchanger 4 for recirculation purposes.

From the above, it is obvious that parasitic power loss of the vehicle motor and pump 5 is reduced during non-braking periods by by-passing cooling fluid around the friction device 7 to eliminate the inherent resistance of this portion of the cooling fluid circulation system and the corresponding load on the vehicle motor and pump. During non-braking periods, the valve 102 by-passes the cooling fluid flow from pumping means 5 back to the heat exchanger 4 through by-pass and return conduits 105 and 11 thereby obviating flow through the friction device 7. When the by-pass valve 102 is simultaneously actuated wtih the friction device 7 and throttling valve 9, the by-pass port 106 is closed which obviates flow through the by-pass conduit 105, and the cooling fluid flows to said friction device and throttling valve in order to carry away the heat generated during the braking period.

It is also obvious that the time delay circuit 123 insures substantially complete heat dissipation after a braking period. The time delay circuit 123 restricts the exhaust flow of air from the by-pass valve air chamber 115 thereby allowing cooling fluid flow through the friction device 7 for a period of time after the completion of the braking application in order to insure that all of the heat generated during the braking application is carried away from said friction device.

Thus, it is apparent that there has been provided a novel brake system which fulfills all the objects and advantages sought therefor. It is to be understood, however, that the foregoing description and the accompanying drawings have been presented only by way of illustration and example and that changes, alterations, and modifications of the present disclosure which will be readily apparent to one skilled in the art are contemplated as being within the scope of the present invention which is limited only by the claims which follow.

What we claim is:

1. A cooling and actuating system for a fluid cooled friction device including relatively rotatable members, a housing secured to one of said members and having a metallic friction element movable into frictional engagement with the other of said members, said system comprising an actuating branch having pressure generating means operably connected with said housing for moving said friction element into frictional engagement, operator controlled means to energize said pressure generating means, and a cooling branch separate from said actuating branch and including a circulation chamber for cooling fluid in said friction member, means for continuously circulating cooling fluid in said cooling branch, valve means independent of said pressure generating means and being interposed in said cooling branch and having an open connection with said circulation means and said chamber, said valve means also having a connection therefrom to said circulating means in by-pass relation with said chamber and normally circulating substantially the entire flow of cooling fluid in by-pass relation with said chamber, said valve means being actuated to close off said by-pass connection in response to said operator controlled means thereby establishing cooling fluid circulation through said chamber, and other means for opposing distortion of said friction element inwardly of said chamber when said rotatable members are frictionally engaged.

2. In a brake system including relatively rotatable friction members having opposed elements adapted for frictional engagement, a chamber in one of said members for receiving cooling fluid in heat exchange relationship with the friction element thereof, fluid flow means through which cooling fluid is circulated through said chamber and through a heat exchanger, and brake actuating means for developing braking pressures moving said members into frictional engagement, the improvement comprising said fluid flow means including fluid pumping means for circulating cooling fluid through said chamber and heat exchanger, fluid throttling means responsive to braking pressures developed by said brake actuating means for providing variable cooling fluid pressures in said chamber proportional with said braking pressures, and valve means having an inoperative position normally directing substantially the entire flow of cooling fluid from said pump means to the heat exchanger in by-pass relation with said chamber and having an operative position directing cooling fluid into said chamber exclusive of said by-pass, said by-pass valve being moved to operative position in response to operation of said brake actuating means.

3. In combination, a fluid cooled friction device including relatively rotatable members movable into frictional engagement, a chamber for cooling fluid in one of said members in heat transfer relation therewith, inlet and outlet ports in said chamber, and separate cooling and actuating systems for said devive, said actuation system comprising operator controlled means for moving said members into frictional engagement, said cooling system comprising pumping means having suction and pressure sides, a heat exchanger connected with the suction side of said pumping means to deliver cooling fluid thereto, a control valve connected with the pressure side of said pump for selectively directing the flow of cooling fluid therefrom, a normally open by-pass port and an open cooling port in said control valve, and by-pass and cooling branches connected in parallel circuit relationship between said by-pass and cooling ports and said heat exchanger, respectively, the inlet and outlet ports of said chamber being serially connected in said cooling branch, said cooling branch having a relatively higher resistance to the flow of cooling fluid than said by-pass branch whereby substantially the entire flow of cooling fluid normally flows from said by-pass port of said valve means through said by-pass branch, and said control valve being responsive to said operator controlled means to close said by-pass port to prevent the flow of cooling fluid through said by-pass branch and direct the flow of cooling fluid through said open outlet port into said cooling branch to conduct the generated heat from said chamber when said members are moved into frictional engagement.

4. In combination, a fluid cooled friction device including relatively rotatable members movable into frictional engagement, a chamber for cooling fluid in one of said members, and separate cooling and actuating systems for said device, said actuating system comprising operator controlled means for moving said members into frictional engagement, said cooling system comprising pumping means, a heat exchanger connected to provide cooling fluid to said pumping means, control valve means connected to receive cooling fluid from said pumping means, and by-pass and cooling branches connected in parallel circuit relationship between said valve means and heat exchanger, said cooling branch including said chamber and having a relatively higher resistance to the flow of cooling fluid than said by-pass branch whereby substantially the entire flow of cooling fluid normally flows from said valve means through said by-pass branch, and said valve means being responsive to said operator controlled means to prevent the flow of cooling fluid through said by-pass branch and direct the flow of cooling fluid into said cooling branch and chamber to absorb the generated heat of frictional engagement when said members are moved into frictional engagement.

5. The system according to claim 4 in which said control valve means includes inlet, by-pass and cooling ports connected with the pressure side of said pumping means, the by-pass branch, and the cooling branch, respectively, said ports normally being in open fluid communication with each other, and valve member responsive to said operator controlled means for closing said by-pass port and maintaining open fluid communication between said inlet and cooling ports.

6. The system according to claim 5 including a timing branch connected between said valve means and operator controlled means to provide substantially instantaneous actuation of said valve member to close said by-pass port and a time delay release of said valve member after the frictional engagement is ended.

7. The system according to claim 5 in which said control valve means includes a control port in pressure fluid communication with said valve member, a timing branch connected between said control port and operator control means comprising parallel connected conduits, a unidirection valve in one of said conduits to provide pressure fluid flow to said control port only, restriction means in the other of said conduits to provide a metered return of said pressure fluid from said control port after the frictional engagement thereby maintaining the valve member in closed position with the by-pass port for a predetermined period during which cooling fluid flows through said chamber to dissipate the generated heat of frictional engagement from said one member.

8. The system according to claim 4 including a timing branch connected between said valve means and operator controlled means to provide relatively instantaneous actuation of said valve means for establishing the cooling fluid flow through said cooling branch and chamber substantially simultaneously with the frictional engagement of said members and to maintain said cooling fluid flow in said cooling branch and chamber for a predetermined period after the end of the frictional engagement to insure substantially complete dissipation of the generated heat of frictional engagement from said one member.

9. The system according to claim 8 in which said timing branch includes unidirectional valve means and flow restriction means connected in parallel circuit relationship between said valve means and operator controlled means, said unidirectional valve providing pressure fluid flow from said operator controlled means to said valve means only, and said flow restriction means providing a metered exhaustion of pressure fluid from said valve means to maintain the cooling fluid flow in said cooling branch and chamber for a predetermined period after the end of the frictional engagement.

10. A system for a fluid cooled friction device including relatively rotatable first and second members having friction elements, the first member having a chamber in communication with the friction element thereof, fluid pressure developing means for actuating said first member into frictional engagement with said second member, operator controlled pressure means for energizing said means for developing fluid pressure, a cooling fluid circulation system independent of said fluid pressure developing means for circulating cooling fluid through said chamber in heat exchange relationship with the friction element of said first member, a throttling valve in said cooling fluid circulation system having a piston movable in response to increases in fluid pressure developed by said fluid pressure developing means to a position restricting the flow of cooling fluid through said cooling fluid circulation system for developing controlled pressures in said chamber to oppose the force of frictional engagement between said friction elements, and a by-pass valve in said cooling fluid circulation system having a by-pass outlet in parallel with said chamber, said by-pass valve having a piston movable in response to pressures exerted by said operator controlled pressure means to a position closing said by-pass outlet for directing cooling fluid flow through said chamber only.

References Cited in the file of this patent

UNITED STATES PATENTS

| | | |
|---|---|---|
| 1,972,353 | North et al. | Sept. 4, 1934 |
| 2,378,100 | Pogue | June 12, 1945 |
| 2,406,304 | Levy | Aug. 20, 1946 |
| 2,471,858 | Bloomfield | May 31, 1949 |
| 2,742,982 | Helmbold | Apr. 24, 1956 |
| 2,821,271 | Sanford | Jan. 28, 1958 |
| 2,821,272 | Sanford et al. | Jan. 28, 1958 |
| 2,821,273 | Sanford et al. | Jan. 28, 1958 |
| 2,889,897 | Sanford et al. | June 9, 1959 |
| 2,911,075 | Damiron | Nov. 3, 1959 |
| 2,946,412 | Jensen | July 26, 1960 |
| 2,964,136 | Schnell | Dec. 13, 1960 |

FOREIGN PATENTS

| | | |
|---|---|---|
| 701,725 | Great Britain | Dec. 20, 1953 |
| 739,244 | Great Britain | Oct. 26, 1955 |

UNITED STATES PATENT OFFICE
CERTIFICATE OF CORRECTION

Patent No. 3,044,582

July 17, 1962

Robert L. Gold et al.

It is hereby certified that error appears in the above numbered patent requiring correction and that the said Letters Patent should read as corrected below.

Column 7, line 40, for "wtih" read -- with --; column 8, line 43, for "devive" read -- device --; column 9, line 21, after "and" insert -- a --.

Signed and sealed this 20th day of November 1962.

(SEAL)
Attest:

ERNEST W. SWIDER
Attesting Officer

DAVID L. LADD
Commissioner of Patents